US012071842B2

(12) United States Patent
Keilers et al.

(10) Patent No.: US 12,071,842 B2
(45) Date of Patent: Aug. 27, 2024

(54) SYSTEM AND METHODOLOGY FOR MIXING MATERIALS AT A WELLSITE

(71) Applicant: SCHLUMBERGER TECHNOLOGY CORPORATION, Sugar Land, TX (US)

(72) Inventors: Adam Ethan Keilers, Richmond, TX (US); Christopher Todd Shen, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/006,648

(22) PCT Filed: Jul. 28, 2021

(86) PCT No.: PCT/US2021/043398
§ 371 (c)(1),
(2) Date: Jan. 24, 2023

(87) PCT Pub. No.: WO2022/026513
PCT Pub. Date: Feb. 3, 2022

(65) Prior Publication Data

US 2023/0287778 A1 Sep. 14, 2023

Related U.S. Application Data

(60) Provisional application No. 63/057,365, filed on Jul. 28, 2020.

(51) Int. Cl.
*E21B 43/26* (2006.01)
*B01F 23/50* (2022.01)
(Continued)

(52) U.S. Cl.
CPC .......... *E21B 43/2607* (2020.05); *B01F 23/56* (2022.01); *B01F 23/581* (2022.01);
(Continued)

(58) Field of Classification Search
CPC .................................................. E21B 43/2607
See application file for complete search history.

(56) References Cited

U.S. PATENT DOCUMENTS 9,416,604 B2 * 8/2016 Cobb .................... E21B 21/062
11,661,834 B2 * 5/2023 Omont .................. G06Q 50/02
166/261

(Continued)

FOREIGN PATENT DOCUMENTS

CA 2939162 C * 10/2023 .............. B01F 23/53
CN 202237826 U * 5/2012

(Continued)

OTHER PUBLICATIONS

Mixing Apparatus With Stator and Method (Year: 2023).*

(Continued)

*Primary Examiner* — Aaron L Lembo
(74) *Attorney, Agent, or Firm* — Jeffrey D. Frantz

(57) ABSTRACT

A technique facilitates mixing of fluids for use in well treatment operations. According to an embodiment, a dry powder material, e.g. a friction reducer, may be thoroughly mixed into fluid or fluids associated with a well treatment operation. The powder material is combined with liquid, e.g. water, via a series of Venturi mixers arranged to thoroughly mix the materials. In some applications, the Venturi mixers are mounted on a modular unit which is readily moved to a desired wellsite. Additional modular units may be added to increase the amount of product being mixed according to the demands of a given well treatment operation, e.g. a hydraulic fracturing operation.

14 Claims, 6 Drawing Sheets

(51) Int. Cl.

| | |
|---|---|
| ***B01F 25/312*** | (2022.01) |
| ***B01F 33/50*** | (2022.01) |
| ***B01F 33/502*** | (2022.01) |
| ***B01F 33/81*** | (2022.01) |
| ***B01F 35/21*** | (2022.01) |
| ***B01F 35/221*** | (2022.01) |
| ***B01F 35/71*** | (2022.01) |
| *B01F 101/49* | (2022.01) |

(52) U.S. Cl.

CPC ........ *B01F 23/59* (2022.01); *B01F 25/31233* (2022.01); *B01F 33/5023* (2022.01); *B01F 33/5026* (2022.01); *B01F 33/811* (2022.01); *B01F 35/2111* (2022.01); *B01F 35/2113* (2022.01); *B01F 35/2211* (2022.01); *B01F 35/7176* (2022.01); *B01F 2101/49* (2022.01)

(56) References Cited

U.S. PATENT DOCUMENTS

| | | | | |
|---|---|---|---|---|
| 2005/0061378 | A1* | 3/2005 | Foret | F04F 5/04 137/888 |
| 2007/0125544 | A1* | 6/2007 | Robinson | E21B 43/30 166/305.1 |
| 2009/0120635 | A1 | 5/2009 | Neal | |
| 2013/0112419 | A1 | 5/2013 | DeFosse et al. | |
| 2015/0114652 | A1* | 4/2015 | Lestz | E21B 43/267 166/308.1 |
| 2019/0112910 | A1 | 4/2019 | Oehring et al. | |
| 2019/0233275 | A1* | 8/2019 | Carr | B67D 7/70 |
| 2023/0193733 | A1* | 6/2023 | Dearborn | G05D 7/0623 166/308.1 |

FOREIGN PATENT DOCUMENTS

| | | | |
|---|---|---|---|
| CN | 203778009 | U | 8/2014 |
| WO | 2012051309 | A2 | 4/2012 |

OTHER PUBLICATIONS

Dispersing And Dissolving Device For Water-mixed Polymer (Year: 2012).*

Search Report and Written Opinion of International Patent Application No. PCT/US2021/043398 dated Nov. 19, 2021; 9 pages.

International Preliminary Report on Patentability of International Patent Application No. PCT/US2021/043398 dated Feb. 9, 2023; 6 pages.

* cited by examiner

SYSTEM AND METHODOLOGY FOR MIXING MATERIALS AT A WELLSITE

CROSS-REFERENCE TO RELATED APPLICATION

The present document is the National Stage Entry of International Application No. PCT/US2021/043398, filed Jul. 28, 2021, which is based on and claims priority to U.S. Provisional Application No. 63/057,365, filed Jul. 28, 2020, which is incorporated herein by reference in its entirety.

BACKGROUND

In many well applications, treatment operations utilize various well treatment fluids which are pumped downhole to facilitate production of well fluids, e.g. oil and gas, from a given well. The treatment operations may comprise hydraulic fracturing in which a well treatment fluid in the form of hydraulic fracturing fluid is pumped downhole along a wellbore and out into a surrounding formation. Some well treatment operations, involve mixing a friction reducing agent into the well treatment fluid to provide improved flow properties and enhanced distribution of the fracturing fluid or other well treatment fluid. For example, various hydraulic fracturing fluids may incorporate a friction reducer typically combined with the fluid via a batch tank into which the various hydraulic fracturing fluid constituents are directed for mixing.

However, current mixing systems often provide insufficient mixing of the constituents. In applications utilizing hydraulic fracturing fluid, the presence of proppant in the fracturing fluid can create complicated fluid dynamics which limit the ability to thoroughly mix in certain materials such as dry friction reducing powders. Without sufficient mixing, friction reducing powders can suffer from a phenomenon known as "fisheyes" when dropped into liquid. Wetted powder tends to form a skin around small pockets of dry powder, thus creating the "fisheyes" of unmixed powder. Additionally, current mixing systems tend to reject proppant and stop mixing after reaching a certain concentration of friction reducer powder.

SUMMARY

In general, a system and methodology are provided for facilitating mixing of fluids for use in well treatment operations. According to an embodiment, a dry powder material, e.g. a dry friction reducer or dry high viscosity friction reducer (HVFR), may be thoroughly mixed into fluid or fluids associated with a well treatment operation. The dry powder material is combined with liquid, e.g. water, via a series of Venturi mixers arranged to thoroughly mix the materials. In some applications, the Venturi mixers are mounted on a modular skid which is readily moved to a desired wellsite. Additional modular skids may be added to increase the amount of product being mixed according to the demands of a given well treatment operation, e.g. a hydraulic fracturing operation.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
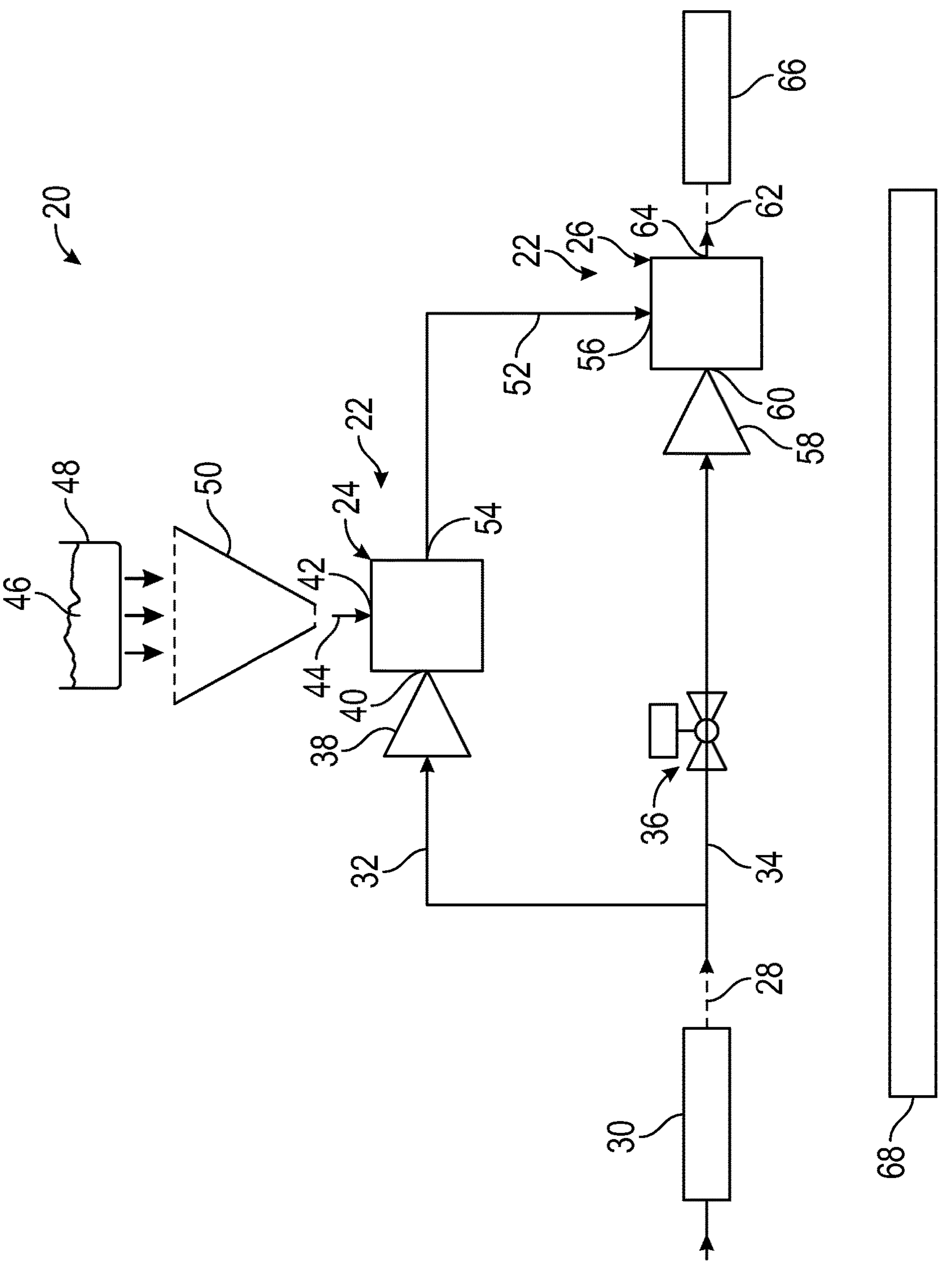
FIG. 1 is a schematic illustration of an example of a Venturi mixer system arranged for thoroughly mixing a dry powder material used in a well treatment operation, e.g. a hydraulic fracturing operation, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology for facilitating mixing of fluids used in well treatment operations. According to an embodiment, a dry powder material, e.g. a dry friction reducer or dry high viscosity friction reducer (HVFR), may be thoroughly mixed into fluid or fluids associated with a well treatment operation. The dry powder material is combined with liquid, e.g. water, via a series of Venturi mixers arranged to thoroughly mix the materials. In some applications, the Venturi mixers are mounted on a modular skid which is readily moved to a desired wellsite and combined with other wellsite equipment. Additional modular skids may be added to increase the amount of product being mixed according to the demands of a given well treatment operation, e.g. a hydraulic fracturing operation.

By way of example, the Venturi mixer system may comprise two Venturi mixers fluidly coupled in series to provide different, selectable flow rates, e.g. two flow rates, and enhanced mixing. Valves may be used to control flow through one or more of the Venturi mixers and also to control flow to a downstream pump, e.g. a downstream positive displacement pump. Each Venturi mixer may be constructed to intake the desired constituent such as a dry powder material and to mix it with a liquid to form a desired fluid mixture. Sometimes Venturi mixers constructed to intake a dry constituent may be referred to as an eductor and Venturi mixers constructed to intake a liquid, e.g. a liquid/powder fluid mixture, may be referred to as a jet pump.

The use of a plurality of Venturi mixers, e.g. two Venturi mixers, in combination with a positive displacement pump or other suitable pump enables a mixing system which is able to eliminate use of a conventional batch tank. In some applications, the flow of driving fluid to one of the Venturi mixers may be closed off via a valve to lower the overall flow rate through the Venturi mixer system, e.g. to provide two flow rates. Additionally, various sensors, e.g. pressure sensors, may be used between the Venturi mixers and a downstream pump so as to better control the speed of the downstream pump based on sensor feedback. By eliminating the batch tank, product concentration can be adjusted more quickly and thus the amount of HVFR or other dry powder material may be rapidly increased or decreased according to the stage or operational characteristics of a given well treatment operation.

Each Venturi mixer utilizes the Venturi principle of creating suction via a driving fluid directed through a Venturi. The suction can be used to pull in liquid or dry material for mixing with the driving fluid as the jet of driving fluid is directed through the Venturi. When using Venturi mixers in series, the Venturi mixers are appropriately sized so that the outlet flow of the first Venturi mixer is able to accommodate a full flow rate through a suction port of the second Venturi mixer. Each of the Venturi mixers may be driven by a suitable liquid, e.g. water, directed through the jets/Venturis.

Such a Venturi based system provides various advantages such as low required horsepower for mixing. Effectively, there is no increase in horsepower required to use multiple Venturi mixers in series in place of a single large Venturi mixer. The serially arranged Venturi mixer system also greatly enhances mixing, e.g. mixing of powders. Powders tend to suffer from a phenomenon known as "fisheyes" when dropped into fluid. The "fisheyes" are formed when wetted powder forms skins around small pockets of dry powder. The jet nozzle forming the Venturi of each Venturi mixer creates highly turbulent flow which disperses the powder into the overall fluid. By placing two Venturi mixers in series, a very thorough hydration of the dry powder occurs by which all or nearly all of the "fisheyes" can be eliminated. The arrangement of mixers increases the system mixing energy by increasing the amount of time the particles are in high shear to facilitate more thorough mixing. In some applications, this more thorough mixing also increases the desired viscosity yield of the chemical. It should be noted the system may be used for thorough mixing of a variety of powders (or liquids) into liquids to form a desired fluid mixture. By way of example, the system may be used to facilitate thorough mixing of dry powder materials, such as dry high viscosity friction reducer (HVFR) powder, into a liquid, e.g. water. One example of dry HVFR is a polyacrymide powder.

Referring generally to FIG. 1, an example of a mixing system 20 is illustrated as having a plurality of Venturi mixers 22. In the specific example illustrated, the plurality of Venturi mixers 22 comprises a first Venturi mixer 24 which is disposed in series with a second Venturi mixer 26. A driving fluid 28, e.g. water, may be supplied to the plurality of Venturi mixers 22 under pressure via a pump 30, e.g. a centrifugal pump.

By way of example, the driving fluid 28 may be split into a first driving fluid flow 32 for driving the first Venturi mixer 24 and a second driving fluid flow 34 for driving the second Venturi mixer 26. A control valve 36 may be positioned along the second driving fluid flow 34 and may be adjusted to control the amount of driving fluid delivered to the second Venturi mixer 26.

During operation, the first driving fluid flow 32 is directed into a jet 38 and through a corresponding Venturi 40 of the first Venturi mixer 24. The flow of fluid through the Venturi 40 creates suction at a suction port/inlet 42 which draws in a desired additive 44. In the example illustrated, the additive 44 may be in the form of a dry powder material 46, e.g. a dry HVFR powder or other suitable powder, which may be supplied from a container 48 and mixed with liquid, e.g. water, at a flush bowl 50 or other appropriate mixing device.

The dry powder material 46 is mixed with the first driving fluid flow 32 within the first Venturi mixer 24 and a resulting mixture 52 is discharged through a Venturi mixer outlet 54. The fluid mixture 52 discharged from outlet 54 is directed to a suction port/inlet 56 of the second Venturi mixer 26. The second driving fluid flow 34 is directed into a jet 58 and through a corresponding Venturi 60 of the second Venturi mixer 26 so as to create suction at the suction port/inlet 56. Accordingly, discharged fluid mixture 52 is drawn in through inlet 56 and mixed with the second driving fluid flow 34 to create an output mixture 62 which is discharged through a Venturi mixer outlet 64 of the second Venturi mixer 26. The output mixture 62 may be directed to a downstream pump 66, e.g. a positive displacement pump, which pumps the mixture 62 to a desired downstream component of an overall well treatment system, e.g. a hydraulic fracturing system, as described in greater detail below. The control valve 36 may be opened or closed to establish different flow rates of output mixture 62, e.g. two different flow rates.

The movement of fluid through the jets 38, 58 creates great turbulence which provides rigorous mixing of the constituents being drawn in through the corresponding suction inlets 42, 56. By using the Venturi mixers 24, 26 in series and by maintaining the desired end flow and suction pressures, mixing performance is substantially increased with no additional power requirements above those of a single Venturi mixer. In the illustrated example, the components (or at least some of the components) of the mixing system 20 are mounted on a modular unit 68 which may be readily transported to desired wellsites and then moved to desired locations at each well site for coupling with corresponding equipment. By way of example, the modular unit 68 may be in the form of a skid or a trailer appropriately sized for over-the-road transport between wellsites.

Figure 2:
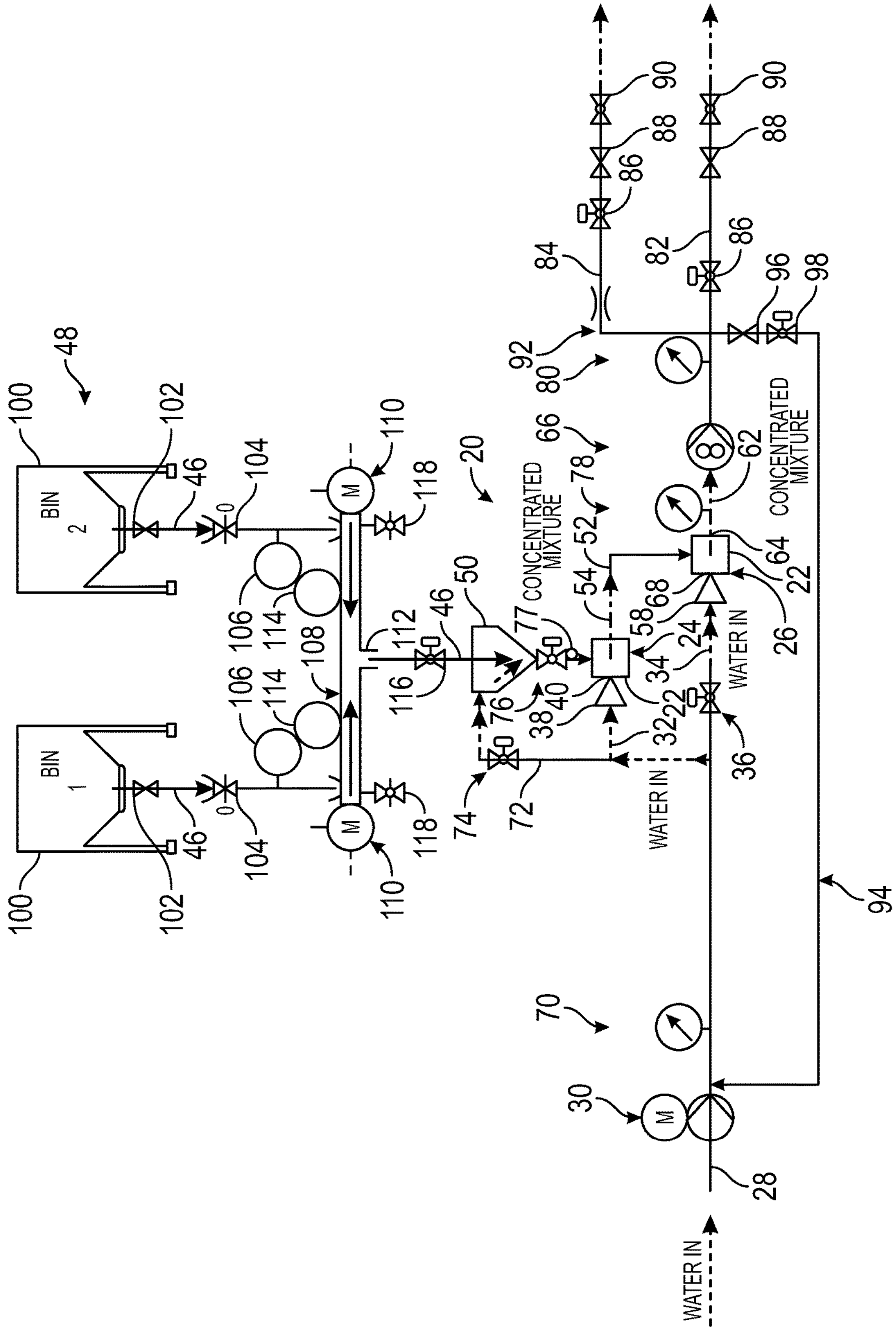
FIG. 2 is a schematic illustration of an example of the Venturi mixer system combined with other components to facilitate mixing and delivery of the dry powder material, according to an embodiment of the disclosure.

Referring generally to FIG. 2, another example of mixing system 20 is illustrated in which the plurality of Venturi mixers 22 have been combined with various sensors and other components to provide enhanced control over operation of the mixing system 20. In this example, the driving fluid 28 may be in the form of water pumped via pump 30 to Venturi mixers 24, 26. A pressure sensor 70 or other appropriate sensor may be positioned between pump 30 and the Venturi mixers 24, 26 to provide feedback as to supply pressure.

As illustrated, a portion of the driving fluid/water 28 may be directed along a flowline 72 to flush bowl 50 for mixing with the dry powder material 46. By mixing water with the dry powder material 46, a fluid may be introduced to suction inlet 42. However, some systems may be designed to directly draw in dry powder through the suction inlet 42. In the embodiment illustrated, a controllable valve 74 is positioned along flowline 72 to enable control over the amount of water delivered to the flush bowl 50. Similarly, a controllable valve 76 may be positioned between flush bowl 50 and suction inlet 42 to enable control over the amount of fluid available at suction inlet 42, e.g. to shut off flow to suction inlet 42. In some embodiments, a sensor 77 may be used to monitor a flow rate from flush bowl 50.

The output mixture 62 may be monitored via a sensor 78. By way of example, the sensor 78 may be a pressure sensor located between outlet 64 and pump 66 so as to monitor a pump inlet pressure (suction pressure) of the fluid feeding pump 66. In some embodiments, an additional sensor 80, e.g. a pressure sensor and/or pump rate sensor, may be positioned at a downstream side of pump 66 to monitor the desired parameter(s) of the output mixture 62 discharged from positive displacement pump 66 (or other suitable pump) used to supply fluid to other components of the overall well system.

In the embodiment illustrated, the output mixture 62 is split into two discharge streams which flow along a first discharge flowline 82 and a second discharge flowline 84. By way of example, the first flowline 82 is used to direct the output mixture 62 (e.g. a concentrated blend of water and HVFR) to a desired downstream system component, such as a blender or a manifold. The second flowline 84 may be used to direct the output mixture 62 to another desired downstream system component, such as a blender or other component. Fluid flow along each of the flowlines 82, 84 may be controlled via corresponding valves, such as controllable valves 86, check valves 88, and/or manually actuated valves 90. A flow control device 92, e.g. a flow control orifice, may be located along one or both of the flowlines 82, 84 to deliver a constant flow rate independent of pressure. Additionally, a flow rate sensor may be incorporated into device 92 or positioned at another suitable location or locations along one or both of the flowlines 82, 84.

Depending on the application, a single flowline, e.g. first discharge flowline 82, may be used or additional flowlines may be added to enable the output mixture 62 to be directed to additional wellsite components. In some applications, an optional recirculation line 94 may be provided to enable at least a portion of the output mixture 62 discharged from pump 66 to be directed to a desired location upstream of the Venturi mixers 24, 26. Flow along the recirculation line 94 may be controlled by a suitable valve or valves, such as check valve 96 and controllable valve 98.

Referring again to FIG. 2, various systems may be used to deliver the dry powder material 46, e.g. dry HVFR, to the flush bowl 50 and/or first Venturi mixer 24. In the example illustrated, dry powder material 46, e.g. dry HVFR, is disposed in container 48 which is in the form of a plurality of bins 100. Each bin 100 may be constructed to gravity feed the dry powder material 46 down through a valve 102, through a controllable valve 104, and past a sensor 106, e.g. a level sensor, which monitors the dry powder material 46 being provided by the corresponding bin 100. An individual bin 100 may be used. However, use of a plurality of bins 100 enables enhanced functionality such as providing backup, redundancy, and/or delivery of a plurality of different constituents/chemicals into the mixture.

In the illustrated example, the dry powder material 46 from each bin 100 flows into a manifold 108 and may be moved along the manifold 108 by a corresponding transport mechanism 110, e.g. a motorized auger, toward a discharge 112. Flow sensors 114 (or other suitable sensors) may be used to monitor the flow of powder along the manifold 108 from each bin 100. When the dry powder material 46 reaches discharge 112, the dry powder material 46 may be gravity fed through a controllable valve 116 and into flush bowl 50. Valve 116 allows the system to be sealed off from moisture. Dry powder material 46 may be sensitive to moisture, e.g. humid air, and valve 116 can be closed between wellsite operational stages or when the system is otherwise not being used to protect the dry powder material 46 from exposure to moisture. In some embodiments, overflow valves 118 may be used to enable relief from jams and also to facilitate clean out of the transport mechanism 110. As the dry powder material 46 moves into flush bowl 50 it is combined with the flow of water directed into flush bowl 50 through flowline 72.

In some embodiments, dry powder material 46 may be supplied from one bin 100 at a time. This allows the second bin 100 to serve as a backup bin 100 to provide redundancy. For example, the valves may be controlled to enable flow of dry powder material 46 from the backup bin 100 when the primary bin 100 is empty or flow of dry powder material 46 from the primary bin 100 is interrupted. However, the bins 100 may be used at the same time or used for different chemicals. In some applications, the controllable valves 104 may be automatically controlled according to data obtained from a variety of sensors such as level sensors 106 and/or additional sensors, such as weight monitoring sensors.

Figure 3:
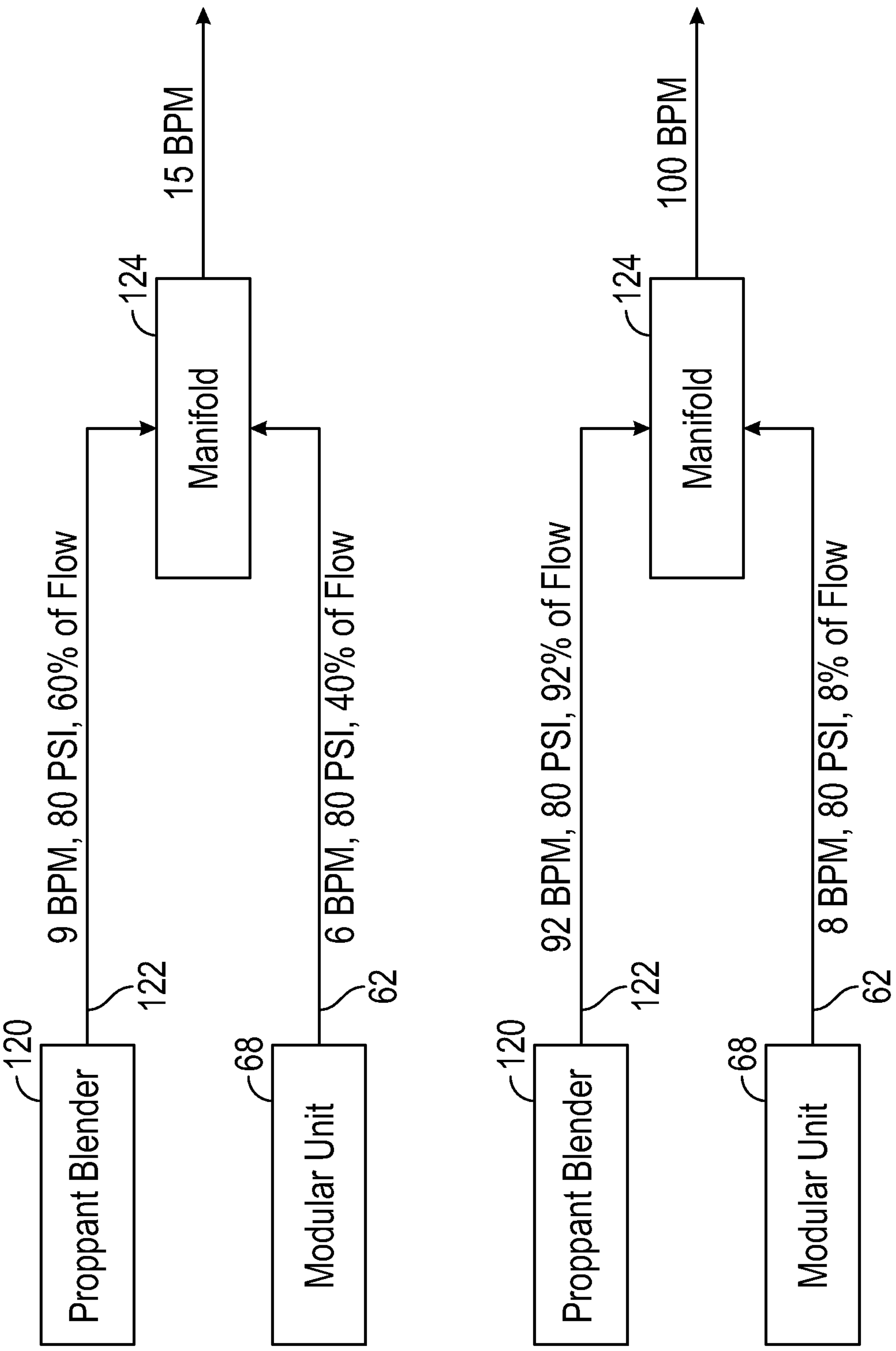
FIG. 3 is a schematic illustration of an example of a portion of a wellsite layout utilizing the Venturi mixer system, according to an embodiment of the disclosure.

Regardless of the specific configuration of mixing system 20 and its cooperating components, the system 20 may be used to facilitate certain control advantages by enabling multiple flow rates. In hydraulic fracturing operations, for example, the output mixture flow 62 from a modular unit 68 may be adjusted for combination with the flow of fluid from, for example, a blender 120, as illustrated in FIG. 3.

By way of example, the illustrated modular unit 68, e.g. skid or trailer, may comprise the serial Venturi mixers 24, 26 along with downstream pump 66 which may be in the form of a positive displacement pump having a constant flow rate outlet. The blender 120 may comprise a variety of blenders constructed for mixing water, proppant, additives, and/or other desired constituents of a given hydraulic fracturing fluid. The mixing system 20 on modular unit 68 may be used to supply, for example, a mixture of water and dry HVFR powder which constitute the output flow 62. Thus, the modular unit 68 (via downstream pump 66) and the blender 120 may supply corresponding fluid flows 62, 122 to a hydraulic fracturing manifold 124 (see FIG. 3).

It should be noted that changing the auger speed of augers 110 changes the amount of added dry powder material 46. Additionally, the output flow 62 may be stepped to provide different outflow rates by turning on different Venturi mixers 24, 26, e.g. both mixers for a higher rate and one mixer for a lower rate. Depending on the operation, desired mass rates of dry powder material can vary between the beginning of a fracturing stage to the middle to end of a stage. By way of specific example, the desired mass rates of dry HVFR powder can range from 1 pound per minute to 50 pounds per minute for each modular unit 68. At the beginning of the fracturing stage it may be desirable to use primarily low concentrations of friction reducer mixed with water (often called "slick water") and by the end of the fracturing stage it may be desirable to have high concentrations of high viscosity friction reducer mixed with water to create high fluid viscosity which helps carry proppant in the wellbore and out into the formation.

Use of dual Venturi mixers 24, 26 enables creation of multiple regimes of flow rates. For a constant inlet pressure, for example, the dual Venturi mixers 24, 26 may be used to establish two different flow rates. For purposes of illustration, the example of FIG. 3 shows modular unit 68 with its corresponding mixer system 20 which can be adjusted to provide two different flow rates of 6 barrels per minute at 80 psi or 8 barrels per minute at 80 psi. This dual rate flow would allow, for example, initiation of a job with a total downhole rate of 15 barrels per minute with the blender 120 contributing 9 barrels per minute and the corresponding modular unit 68 contributing 6 barrels per minute. As the overall flowrate downhole is increased to, for example, 100 barrels per minute, the output of blender 120 can be increased to 92 barrels per minute while the output of the corresponding modular unit 68 may be increased to contribute 8 barrels per minute.

It should be noted that flow may be established by the proppant blender 120 before establishing flow at modular unit 68 to avoid certain undesirable flow results such as backflow to the blender 120 before it is appropriately discharging and applying back pressure. In this particular example, the blender 120 comprises a centrifugal or vortex type pump which can respond rapidly to changes in flow rates from high pressure positive displacement pumps. The pump 66 associated with the modular unit 68 also may be a positive displacement pump which is controlled to take all of the flow from the Venturi mixers 24, 26 and to respond to different back pressures applied by the blender 120. The pump 66 helps maintain a stable flow so as to avoid back pressures in the system which could overflow the flush bowl 50 or cause other problems in the system.

The ability to stagger flow rates of output flow 62 helps ensure that the modular unit 68 is not the dominant flow contributor even at low flow rates. In many applications, it is beneficial for the proppant blender 120 to always be the dominant fluid contributor for consistent delivery to downstream high pressure pumps.

With respect to changing the amount of output flow 62, the control valve 36 may be adjusted, as described above, to control the amount of driving fluid flow 34 moving through the second Venturi mixer 26 and thus the total amount of output flow 62 supplied to positive displacement pump 66. If, for example, valve 36 is closed, the total amount of output flow 62 which can be supplied to pump 66 must pass through the first Venturi mixer 24 and then through the second Venturi mixer 26 via inlet 56. Accordingly, the output flow 62 is reduced compared to an open valve position in which both driving fluid flow 32 and driving fluid flow 34 are passing through Venturi mixers 24, 26 respectively. This change can cause the difference between the two levels of flow, e.g. 6 barrels per minute versus 8 barrels per minute.

Figure 4:
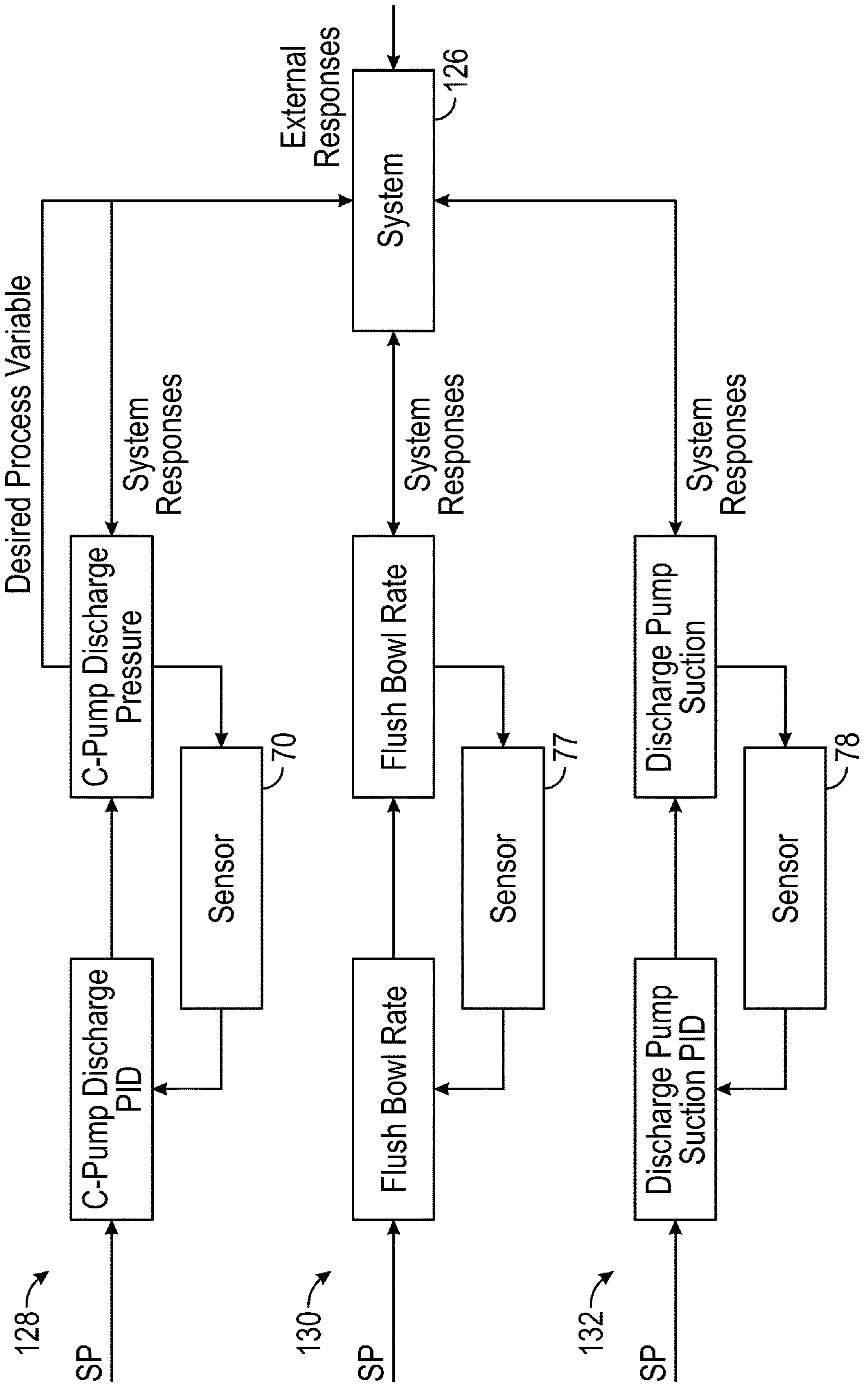
FIG. 4 is a schematic illustration of an example of a sensor and control system for use in combination with the Venturi mixer system, according to an embodiment of the disclosure.

Referring generally to FIG. 4, a schematic representation is provided to illustrate the ability of mixer system 20 to provide rapid responses with respect to changes in dry powder material mass rate or fluid mixture concentration based on, for example, changes in outlet flow rates and discharge pressures. This may be achieved via a control system 126, e.g. a computer/processor-based control system, which receives feedback from various sensors, e.g. sensors 70, 77, 78, 80, to enable appropriate system responses.

By way of example, control system 126 may be programmed to utilize control loops decoupled from each other. In some embodiments, the control system 126 may be in the form of a proportional-integral-derivative (PID) controller which utilizes feedback from certain sensors, e.g. sensors 70, 77, 78, 80, and compares the sensor feedback to corresponding set points (SP) for each control loop. In the example of FIG. 4, three decoupled control loops 128, 130, 132 are illustrated. Control loop 128 establishes a set point with respect to a pump discharge pressure of centrifugal pump 30 while the actual pump discharge pressure is monitored via sensor 70. External responses also may be monitored. Based on deviations from the set point, system adjustments/responses may appropriately be made.

Similarly, control loop 130 establishes a set point but this set point is established with respect to flowrate from flush bowl 50 while monitoring the actual flowrate from flush bowl 50 via sensor 77. Again, based on deviations from the set point, system adjustments/responses may be performed. In this example, the control system 126 also may be programmed to establish a set point with respect to suction at downstream discharge pump 66 while monitoring the actual pressure at this location via sensor 78 (see control loop 132). The appropriate system adjustments/responses may be made based on deviations from the set point.

It should be noted that in general the driving fluid pressure of the Venturi mixers 24, 26 determines the flowrate of the output flow 62. By monitoring pressures/flow rates associated with the output flow 62, rapid system adjustments may be made. For example, if large disturbances are detected via sensor 78 regarding changes in suction pressure, certain operational parameters, e.g. flow rate through the flush bowl flowline 72 or flowrate of discharge pump 66, can be adjusted quickly in response. Such rapid adjustments are better able to protect components of the system from unwanted pressure pulses, chemical contamination to the system, and/or other unwanted occurrences.

Figure 5:
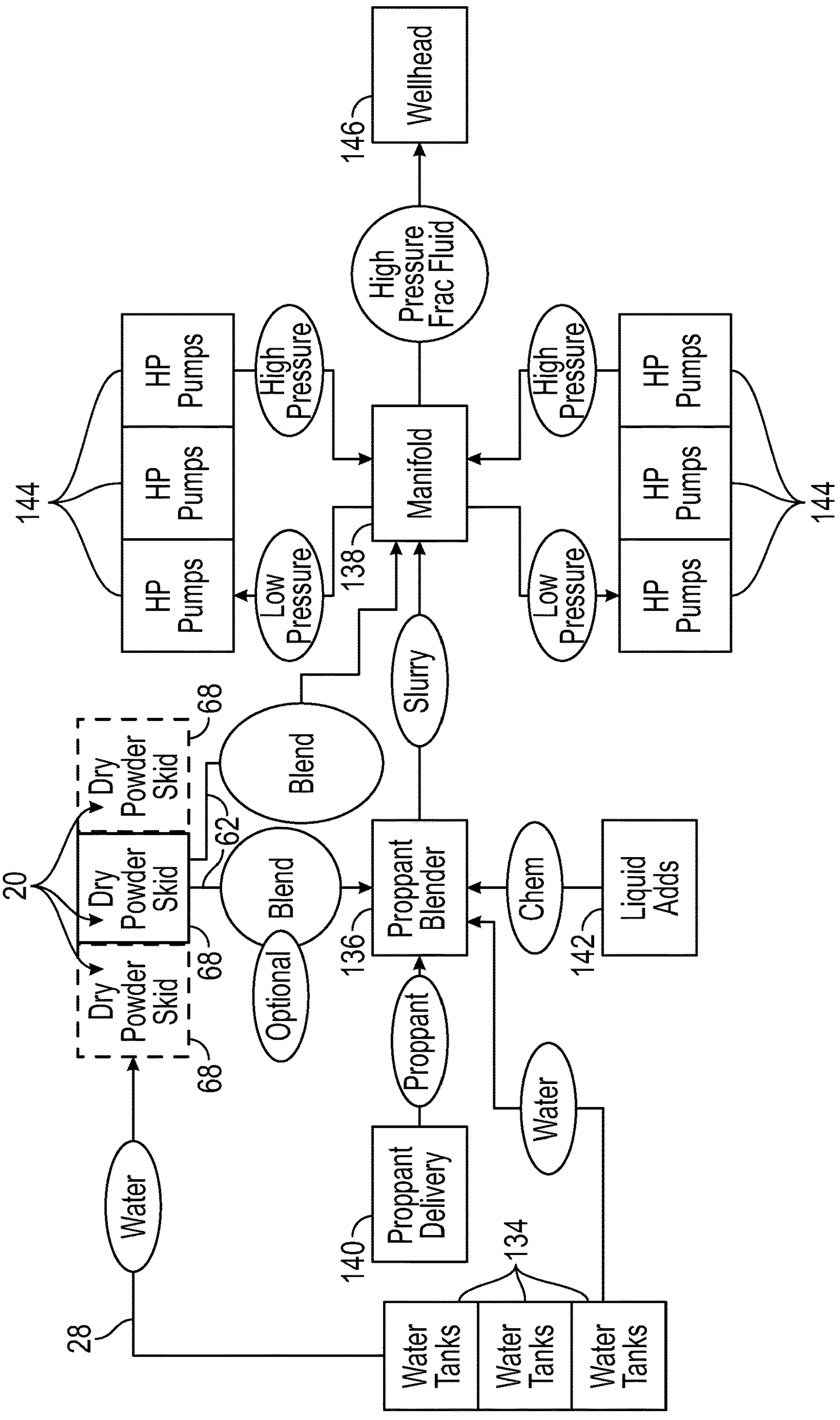
FIG. 5 is a schematic illustration of an example of wellsite layout utilizing the Venturi mixer system in an overall hydraulic fracturing arrangement for delivering fracturing fluid into a wellbore, according to an embodiment of the disclosure.

Referring generally to FIG. 5, an example of a wellsite layout is illustrated for use in a hydraulic fracturing operation. In this example, 1-3 modular units 68 (e.g. 1-3 skids and/or trailers) may be used to provide a desired amount of dry powder material mixed with liquid. By way of example, each modular unit 68 may comprise its own mixing system 20 combined with upstream pump 30 and downstream pump 66. As illustrated, the driving fluid 28 may be in the form of water supplied via one or more water tanks 134. The output flow 62 from the one or more modular units 68 may be split so that a portion of the output flow 62 is provided to a proppant blender 136 while the remainder of the output flow 62 is provided to a manifold 138 which is also able to function as a pipe mixer for improved mixing. For example, a relatively small amount, e.g. one barrel per minute, of the output flow 62 may be supplied to the proppant blender 136 and a larger remainder, e.g. eight barrels per minute, of the output flow may be supplied to the manifold 138. The portion of output flow 62 directed to proppant blender 136 may be optional in some applications.

As further illustrated, proppant is supplied to the proppant blender 136 from a proppant supply 140. Additionally, water may be supplied to the proppant blender 136 from water tanks 134 for mixing with the sand. In some embodiments, various liquid additives may be provided to the proppant blender 136 via a liquid additive supply 142. The output flow 62 is mixed with the proppant, water, and liquid additive to create a desired proppant slurry which is mixed with the larger remainder of output flow 62 in the manifold 138. The resulting fracturing fluid mixture is delivered under low pressure to a plurality of high pressure pumps 144 which then pump the resulting fracturing fluid mixture back into manifold 138 under high pressure. This high pressure well treatment fluid, e.g. fracturing fluid mixture, is then directed through a wellhead 146 and downhole for distribution into a surrounding formation.

The number of modular units 68 employed can be selected to achieve the desired concentration of dry powder material, e.g. dry HVFR powder, in the fracturing fluid mixture so as to facilitate movement of the proppant through the wellbore and out into the surrounding formation. The mixing system 20 on each modular unit 68 ensures rigorous mixing of the dry powder material into the liquid for improved effectiveness in establishing the desired properties, e.g. higher viscosity, of the fracturing fluid mixture. This higher viscosity facilitates carrying of the proppant particles out into the surrounding formation during a fracturing operation.

Figure 6:
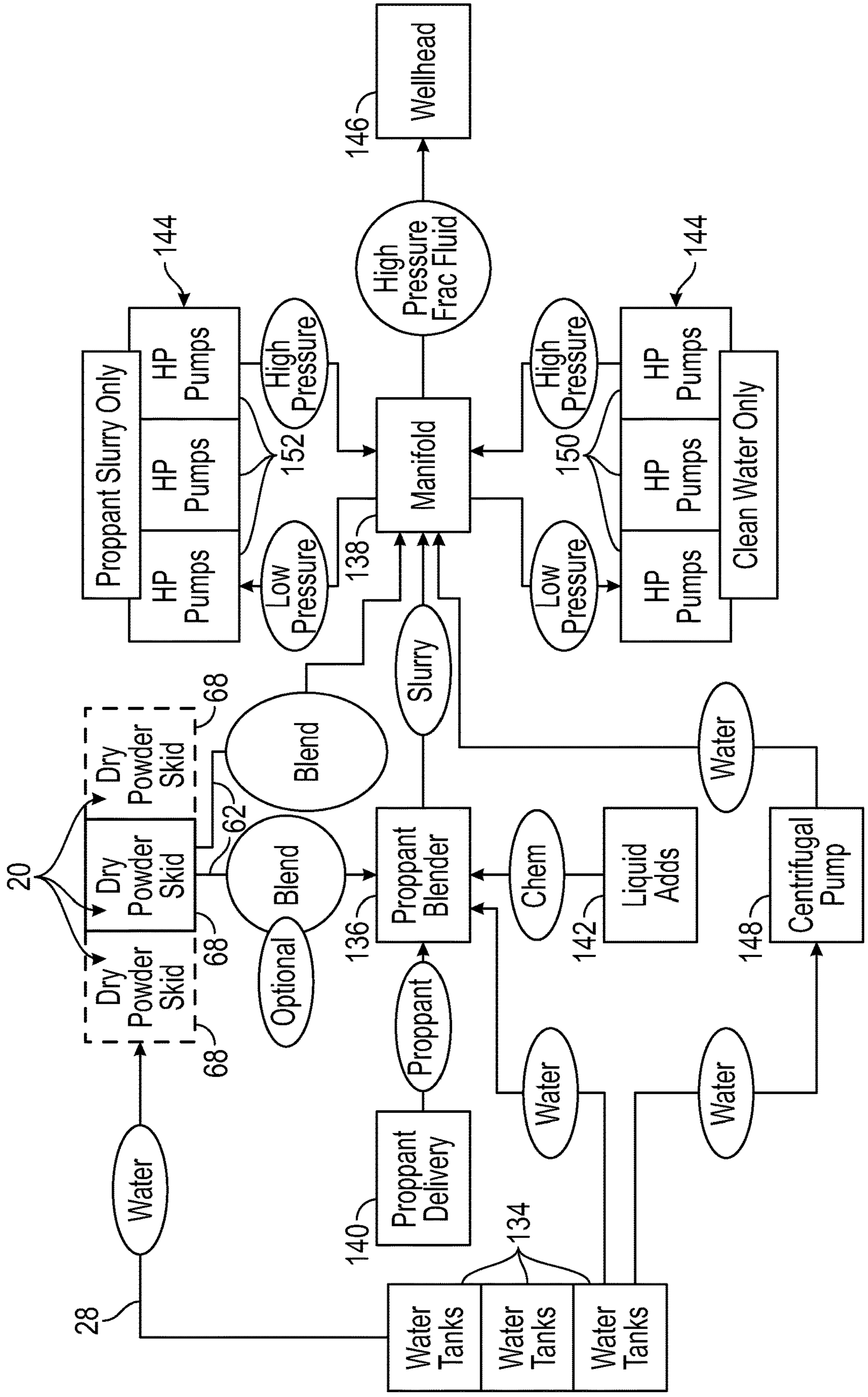
FIG. 6 is a schematic illustration of another example of wellsite layout utilizing the Venturi mixer system in an overall hydraulic fracturing arrangement for delivering fracturing fluid into a wellbore, according to an embodiment of the disclosure.

Referring generally to FIG. 6, another example of a wellsite layout is illustrated for use in a hydraulic fracturing operation. In this example, many of the components are the same or similar to those described in FIG. 5 and have been labeled with common reference numerals.

As illustrated, one or more modular units 68 may be utilized to provide the desired amount of dry powder material as described above with reference to FIG. 5. In the fracturing system layout of FIG. 6, however, a separate stream of water from water tanks 134 is directed to a centrifugal pump 148. The centrifugal pump 148 is used to supply water directly to manifold 138 which, in turn, supplies a portion of the high-pressure pumps 144 with low pressure water. In this arrangement, the high-pressure pumps 144 are divided into two groups containing water only pumps 150 and proppant slurry only pumps 152.

The water only pumps 150 receive low pressure water supplied from centrifugal pump 148 and pump the water under high pressure back into manifold 138. Similarly, the proppant slurry only pumps 152 receive low pressure proppant slurry mixed with a dry powder material, e.g. dry HVFR powder, and then pump the resulting proppant slurry mixture under high pressure back into the manifold 138. The high-pressure water and high-pressure proppant slurry are then combined into the well treatment/fracturing fluid and directed under high-pressure to wellhead 146 for distribution along the wellbore and out into the surrounding formation.

In this type of operation, e.g. water only and proppant slurry only streams (sometimes called a split stream operation), the number of modular units 68 employed can similarly be selected to achieve the desired concentration of dry powder material, e.g. dry HVFR powder, for mixture into the proppant slurry stream. The mixing system 20 on each modular unit 68 again ensures rigorous mixing of the dry powder material for improved effectiveness in establishing the desired properties of the fracturing fluid mixture.

Depending on the parameters of a given operation, the mixing system 20 may be combined with a variety of hydraulic fracturing wellsite layouts and other well treatment layouts. Each mixing system 20 or combinations of mixing systems 20 may be mounted on a transportable skid, trailer, or other modular unit 68 along with various other desired components, such as pumps, flush bowls, sensor systems, containers, and/or other desired components. However, some operations may utilize mixing systems 20 which are not mounted on modular units 68 and which may be combined with or incorporated into various other equipment. Furthermore, the sensors used to monitor the various pressures, flow rates, and/or other parameters associated with each mixing system 20 may vary. Similarly, the type of processing system 126 may have a variety of forms and may be utilized in providing automated control over flow through each mixing system 20 and/or utilized in providing outputs to an operator. The number, type, and arrangement of serial Venturi mixers also may be adjusted according to the types of fluids being mixed and the overall parameters of a given well treatment operation.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for use in a well treatment operation, comprising:

a manifold configured to combine fluid flows into a well treatment fluid for delivery into a wellbore;

a blender system in fluid communication with the manifold to deliver a first fluid flow comprising water and proppant; and a mixer system in fluid communication with the manifold to deliver a second fluid flow comprising water mixed with a dry powder material, the mixer system comprising:

a first Venturi mixer powered by a first flow of drive fluid pumped through a first Venturi to create suction at a first suction inlet positioned to draw in a flow containing the dry powder material so as to discharge a mixture of the drive fluid and the dry powder material through a first outlet; and a second Venturi mixer powered by a second flow of drive fluid pumped through a second Venturi to create suction at a second suction inlet connected in fluid communication with the first outlet, the second flow of drive fluid being combined with the mixture discharged from the first outlet to create the second fluid flow, the second fluid flow being discharged from the second Venturi mixer through a second outlet to allow continued movement of the second fluid flow to the manifold, wherein the mixer system further comprises a control valve positioned to enable control over the second flow of drive fluid to the second Venturi mixer.

2. The system as recited in claim 1, wherein the mixer system is mounted on a modular unit in the form of at least one of a skid or a trailer.

3. The system as recited in claim 2, wherein the mixer system comprises a plurality of mixer systems each mounted on a corresponding modular unit.

4. The system as recited in claim 1, wherein the dry powder material is initially a dry friction reducer.

5. The system as recited in claim 1, wherein the dry powder material is initially a dry high viscosity friction reducer.

6. The system as recited in claim 1, wherein the dry powder material is delivered to the mixer system from a plurality of bins which provide redundancy or different constituents of the dry powder material.

7. The system as recited in claim 1, wherein the first and second flows of drive fluid comprise flows of water.

8. The system as recited in claim 1, further comprising a centrifugal pump positioned to deliver the first and second flows of drive fluid to the mixer system.

9. The system as recited in claim 1, further comprising a sensor system to monitor pressures for optimizing fluid flows to the manifold.

10. A method, comprising:

mixing a dry powder material with water via a mixing system having a series of Venturi mixers arranged to output a mixture of the dry powder material and water to a manifold;

utilizing a sensor system to monitor flow through the mixing system;

providing data from the sensor system to a processing system for processing to determine control inputs for controlling flow through the mixing system;

directing a fluid flow of water and proppant to the manifold for combination with the mixture of dry powder material and water, thus creating a well treatment fluid; and pumping the well treatment fluid downhole into a wellbore.

11. The method as recited in claim 10, wherein utilizing the sensor system comprises monitoring a discharge pressure of a pump supplying water to the mixing system to drive the Venturi mixers.

12. The method as recited in claim 11, wherein utilizing the sensor system comprises monitoring a flow rate of a downstream pump which receives the output mixture of dry powder material and water from the mixing system.

13. The method as recited in claim 11, wherein utilizing the sensor system comprises monitoring a suction pressure of a positive displacement pump which receives the output mixture of dry powder material and water from the mixing system.

14. The method as recited in claim 10, further comprising mounting the mixing system on a module unit sized for transport between wellsites.

* * * * *